(No Model.)
S. H. FRENCH & W. J. MALTBY.
WHEEL HUB.
No. 337,319. Patented Mar. 2, 1886.
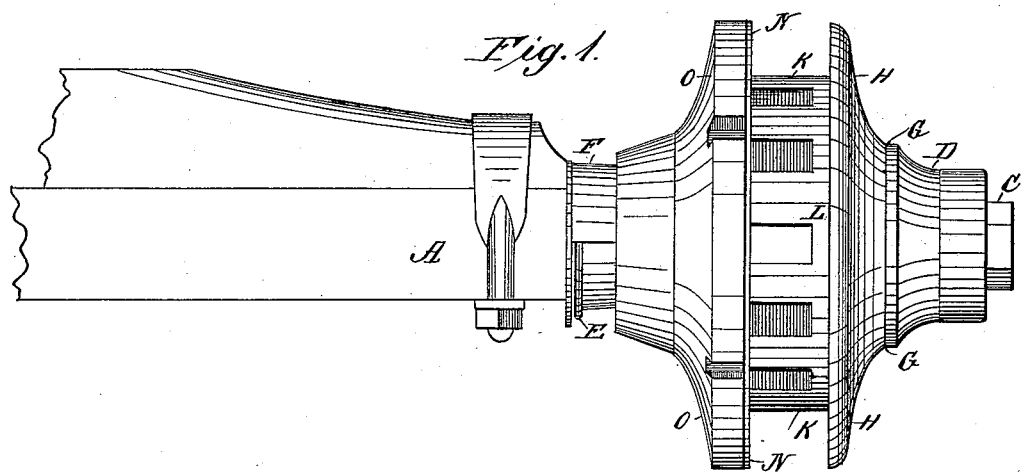
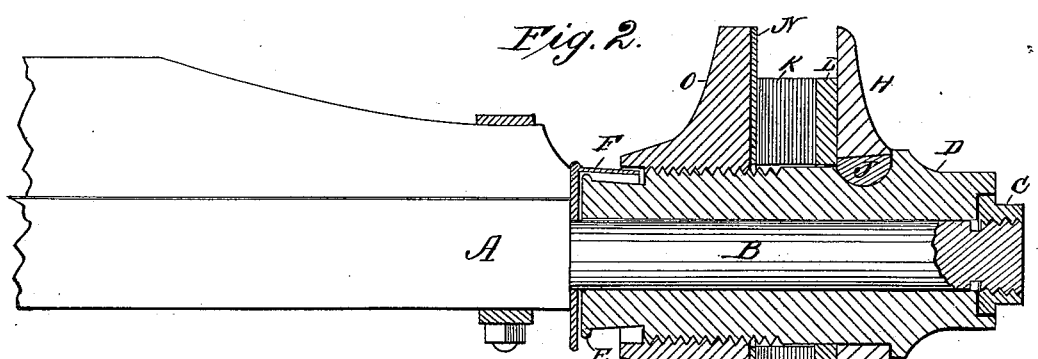
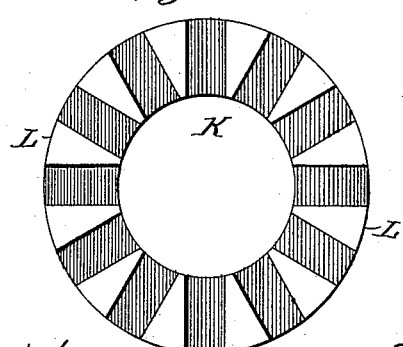
WITNESSES:
W. W. Hollingsworth
W. B. Stevens.
INVENTOR:
S. H. French
W. J. Maltby
BY Munn & Co
ATTORNEYS.

UNITED STATES PATENT OFFICE.

STEPHEN H. FRENCH AND WILLIAM J. MALTBY, OF BAIRD, TEXAS.

WHEEL-HUB.

SPECIFICATION forming part of Letters Patent No. 337,319, dated March 2, 1886.

Application filed November 6, 1885. Serial No. 182,028. (No model.)

*To all whom it may concern:*

Be it known that we, STEPHEN H. FRENCH and WILLIAM J. MALTBY, citizens of the United States, residing at Baird, in the county of Callahan and State of Texas, have invented a new and useful Improvement in Wheel-Hubs, of which the following is a description.

This invention relates to that class of wheel-hubs which are made up of several parts in order that they may be cast in metal; and the object of the invention is to adapt the mortise-piece of the hub to be cast independently of the flanges, to form a positive clamp for the shoulders, and to protect the bearing from sand.

To this end our invention consists in the construction and combination of parts forming a wheel-hub, hereinafter described and claimed, reference being had to the accompanying drawings, in which—

Figure 1 is a side elevation of a portion of an axle and our hub mounted thereon. Fig. 2 is a longitudinal vertical section of the same, and Fig. 3 is a detail face view of the mortise-piece.

A represents the axle, having the usual arm, B, screw-threaded at its outer end to receive the nut C, which retains the wheel-hub on the arm.

D is the body of the hub, grooved around its inner end, to form the flange E, which, passing under the sand-guard F, forms the sand-shield. The guard F is a common hood secured to the axle to extend over the inner end of the hub around the upper half thereof. This prevents sand from falling at the end of the hub, and whatever sand works off at the end of the band falls into the groove in the hub behind the flange E, and is likely to be dropped to the ground before it can work over the flange. To aid in effecting this result, the body of the hub at the bottom of the groove is conical, tapering away from the flange, thus forming the widest space between the guard F and the said body at the end of the guard farthest from the end of the hub.

The outer end of the body is provided with a flange, G, serving as a shoulder, against which a collar, H, may abut. This collar may be held from turning on the body by any usual means—such as a feather or spline, J—projecting from the body into a slot in the collar.

K is a ring mortised radially in at one face, smaller than the collar H, and placed with its whole side against the same, the open side of its mortises being toward the inner end of the hub, thus forming a shoulder, L, for a shoulder of the spoke M to rest on.

N is a washer fitted to rest against the tenons and a portion of the bodies of the spokes.

O is the inner end collar, of the same size as the outer end collar, H, and internally screw-threaded, forming a nut to engage a screw on the body D. This nut is notched at its edges to receive a spanner-wrench or the end of a set-tool, to be turned onto or off from the body. By this means any amount of force may be applied to press the spokes into the mortises and to hold them between the collar H and washer N.

The spokes are supported where they should be on the outer or dishing side of the wheel on the shoulder L, and their inner faces are smooth, whereby common punched washers, N, will fit them, and cause the nut to bear without grinding on the wood of the spokes. If a great and sudden strain were suddenly brought to bear circumferentially on this wheel, the mortised collar and spokes therein would yield and turn a little on the body between the collars before the spokes would break, thus removing one source of danger which has been common to wheels.

What we claim as our invention, and desire to secure by Letters Patent, is—

1. The combination, with an axle and a hood or guard fixed thereon, of a hub reduced at one end and provided with a flange at the outer end of said reduction, and a collar or nut having a flange projecting over the free end of said hood or guard, said hood or guard fitting over said reduction of hub, substantially as and for the purpose set forth.

2. The combination of the hub-body D, provided with the shoulder G near its outer end and a screw-thread along the inner portion, the spline J near said shoulder, the slotted collar H, fitted to said shoulder and spline, the removable ring K, smaller than the collar and having radial mortises in one side, and shoulders L in alignment with said mortises, upon which shoulders rest shoulders of the spokes, the washer N, fitted against the ring K, and the internally-screw-threaded nut or collar O, fitted upon the threaded body D, substantially as and for the purpose set forth.

STEPHEN H. FRENCH.
WM. J. MALTBY.

Witnesses:
A. A. BELL,
J. N. RUSHING.